Dec. 10, 1968  L. A. MYERS  3,415,228

FEED CONTROL APPARATUS

Filed Aug. 22, 1966

Inventor
Laurence A. Myers.
By: Olson, Trexler, Wolters & Bushnell attys.

United States Patent Office 3,415,228
Patented Dec. 10, 1968

3,415,228
FEED CONTROL APPARATUS
Lawrence A. Myers, Milford, Ind., assignor to Chore-Time Equipment, Inc., Milford, Ind., a corporation of Indiana
Filed Aug. 22, 1966, Ser. No. 573,979
8 Claims. (Cl. 119—51.11)

ABSTRACT OF THE DISCLOSURE

There is disclosed a control system for a mechanical poultry feeder in which a feed actuated panel switch is provided for stopping a conveyor motor when a predetermined amount of feed has been delivered, and electromagnetic means is energized for holding the panel to prevent starting of the conveyor motor for a predetermined period of time.

---

This invention relates generally to a fed control device and more particularly to a feed control device for regulating the operation of a mechanical poultry feeder.

Mechanical poultry feeders generally include a series of conveyors which are supplied with feed from a common source or feed hopper. The conveyors are driven by motors to distribute the feed to a plurality of outlets or feeding stations. Feed pans or troughs are mounted adjacent to the feeding stations to receive the feed from the conveyors. The poultry can then readily consume the feed from the pans or troughs.

The controlling of the distribution of the feed to the pans or troughs is commonly done by means of a cut-off switch which is located at a control feeding station. The cut-off switch is actuated when a predetermined volume of feed has accumulated in the feed pans at the control feeding stations. Actuation of the cut-off switch interrupts the power circuit to the conveyor drive motor and stops the conveyor and the feed distribution. Therefore, the cut-off switch is actuated in response to the accumulation of a predetermined quantity of feed at a control station to prevent the pans or troughs from being filled to overflowing with feed. When the poultry have consumed enough feed to reduce the quantity of feed at the control station below a predetermined amount the cut-off switch is released and the feed conveyors are again driven to raise the level of feed at all of the feeding stations.

In the above system, the quantity of feed distributed is regulated as a function of the rate at which the feed is consumed by the poultry. The system of feed control is very satisfactory for use in many mechanical poultry feeder installations. However, such a system does not provide for an accumulation of only a predetermined amount of feed at the feed pans at predetermined times.

In many mechanical feeder installations the efficient distribution of feed and raising of the birds requires that only a predetermined amount of feed be accumulated at the feeding stations at a particular predetermined time. To prevent an overfeeding of the birds and a wasting of feed, the mechanical feeder should, after the predetermined amount of feed has been accumulated, be shut off until the next succeeding feeding time when the predetermined quantity of feed is again accumulated at the feeding stations. Thus, the efficient feeding of poultry often requires that the control feeders be operated, at predetermined feeding times, to accumulate a predetermined quantity of feed at the feeding stations. Once this predetermined quantity of feed has been accumulated, the conveyors should be rendered inoperative until the next succeeding predetermined feeding time.

Therefore, one of the objects of this invention is to provide a control system for a mechanical feeder which will enable a predetermined quantity of feed to be accumulated at a feeding station at predetermined feeding times.

Another object of this invention is to provide a mechanical poultry feeding system which enables a predetermined quantity of feed to be accumulated at a predetermined feeding station at a predetermined time and is disabled after the predetermined quantity of feed has been accumulated until the next succeeding predetermined feeding time.

These and other objects and features of the invention will become more apparent upon a reading of the following detailed description taken in connection with the accompanying drawings, wherein.

Figure 1:
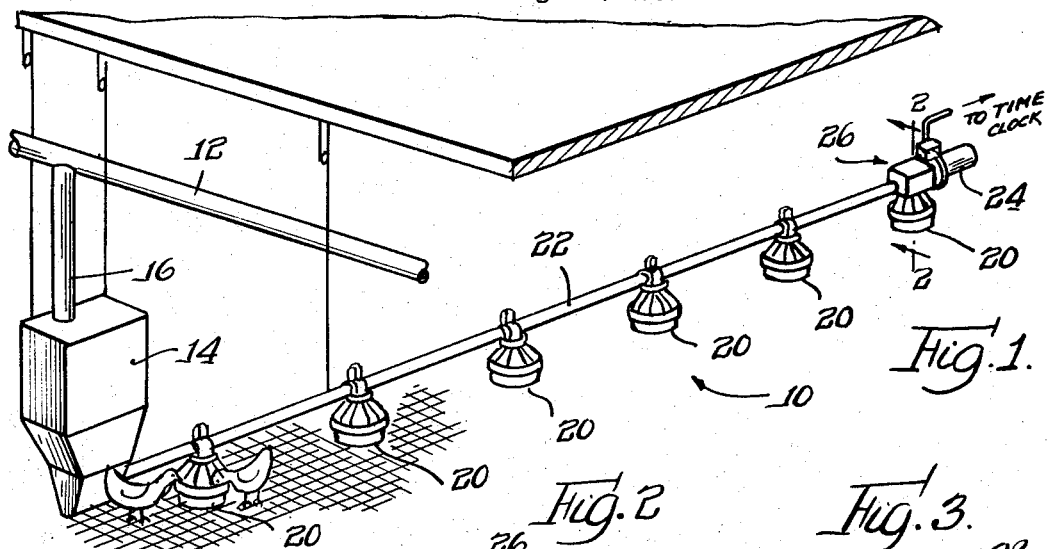
FIG. 1 is a perspective view of a single feeder line and feed hopper of a mechanical poultry feeder system.

Referring now to the drawings in greater detail, there is shown in FIG. 1 a perspective view of a single feeding line 10 for a mechanical poultry feeder system. The feeding line 10 is supplied with feed from a feed supply line 12 and a feed hopper 14. Feed is conducted from the feed supply line 12 to the hopper 14 through a flexible downwardly extending conduit or feed line 16. Feed is distributed from the hopper 14 to a plurality of feeding pans 20 by an enclosed conveyor 22.

The conveyor 22 is driven by an electric motor 24 which is mounted at the end of the feed line 10 adjacent to a control feeding station 26. As is perhaps best seen in FIG. 2, the control feeding station 26 is supported by an outer housing 28 for the conveyor line 22. The motor 24, through an outwardly extending shaft 30 drives a screw conveyor 32, of known construction, to distribute feed 36 to an outer end of the feed line or conveyor 22. The feed 36 is conducted through a feed diffusing assembly 38 to the feed pans 20. The feed 36 is then consumed by poultry from the feed pans. The construction of such a mechanical poultry feeder system may advantageously be substantially similar to that described in United States Patent No. 3,033,163 granted to Hostetler et al., the disclosure of which is incorporated herein by this reference.

The control feeding station 26 is supported by the outer housing 28 of the conveyor line 22, by a vertically extending bracket 40 which is secured to the feed diffusing assembly by a suitable connection means 42. The motor 24 is also mounted on the feed diffusing assembly 38 by a suitable connection means 46 and 48. The feed diffusing assembly is of a generally rectangular configuration and includes a pair of spaced apart vertically extending sidewalls 50 and 52 (see FIG. 3), which are interconnected by a second pair of vertically extending sidewalls 54 and 56 (see FIG. 2). A feed level sensing lever or panel 60 is pivotably mounted on a suitable shaft 62 which extends between the two sidewalls 50 and 52. The sensing panel 60 extends from a position adjacent the sidewall 52 to a position adjacent the sidewall 50 so that feed being conducted from the end of the conveyor housing 28 engages an inner surface 64 of the panel 60 and presses the panel outwardly toward a retaining means 66 which is mounted on the sidewall 54 of the feed diffuser assembly 38. Since the sensing panel 60 extends compeltely across the feed diffusing assembly 38, feed pressure is substantially evenly distributed across the panel 60.

A switch assembly 68 is mounted with a spring loaded plunger or actuated 70 positioned adjacent to an inner surface 72 of the panel. The spring loaded plunger 70 pressures the panel inwardly, toward the downwardly flowing feed 36. When the level of the feed in the pan 20 has exceeded a predetermined amount, the pressure of the feed against the broad inner surface 64 of the panel 60 forces the panel outwardly toward the retaining means 66 against the spring pressure of the plunger 70. This outward movement of the sensing panel 60 actuates the switch 68 to stop the drive motor 24 and the rotation of the conveyor screw 32. Therefore, when a predetermined quantity of feed has been accumulated at the control feeding station, the panel 60 is pivoted outwardly to actuate the switch assembly 68 and shut off the drive motor, since an adequate supply of feed is present in the pan 20. It should be noted that all of the feed pans 20 for the feeding line 10 are controlled by the feed level at the control feeding station 26 in much the same manner as set forth in the aforementioned Patent No. 3,033,163. This is because of the fact that the feed pans 20 are all supplied with feed by the conveyor screw 32 through outlets or feeding stations in the conveyor housing 28.

Figure 2:
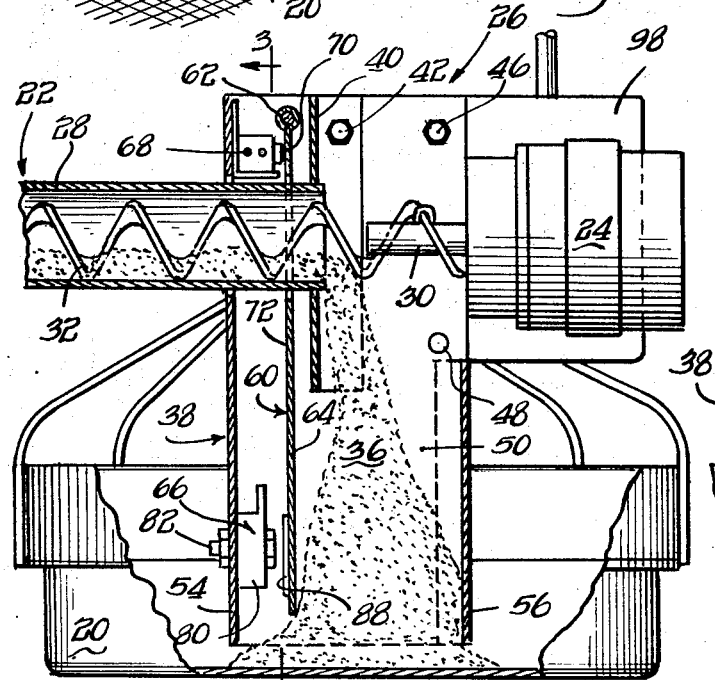
FIG. 2 is an enlarged cross-sectional view, taken along the line 2—2 of FIG. 1, illustrating the construction of a control feeding station.
Figure 3:
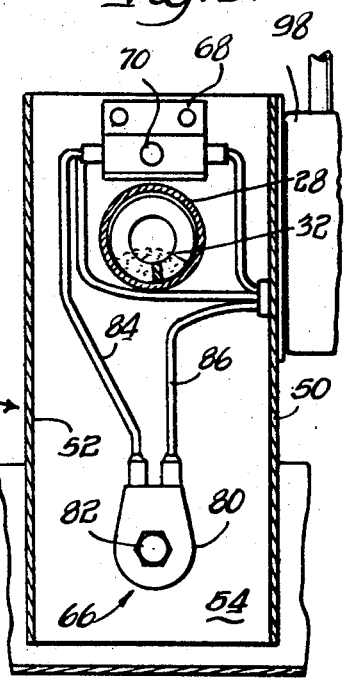
FIG. 3 is an enlarged detail sectional view, taken along the line 3—3 of FIG. 3 illustrating the positioning of a magnet means for retaining a feed level sensing lever or panel.

Referring now to FIG. 3, taken in conjunction with FIG. 2, the retaining means 66 includes an electromagnet 80 mounted on the sidewall 54 by a bolt 82. The electromagnet 80 is energized through leads or conductors 84 and 86. The electromagnet 80, when energized, attracts a metallic slug 88 (see FIG. 2) which is mounted on the outer surface 72 of the sensing panel 60. When the electromagnet 80 is energized, the electromagnet retains the panel 60 in a position adjacent to the sidewall 54 to hold the switch assembly 68 in an actuated position. Although a metal slug 88 is utilized in a preferred embodiment of the invention, it will be apparent to those skilled in the art that a panel of a magnetizable material could also be utilized.

Figure 4:
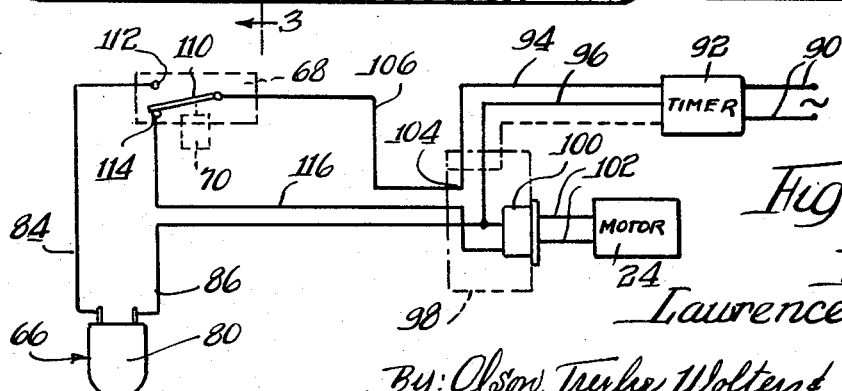
FIG. 4 is a schematic drawing of the control circuit utilized in connection with the control feeder station of FIG. 2 in the mechanical feeder system of FIG. 1.

A schematic drawing of a preferred embodiment of a control circuit for the control feeding station 26 is set forth in FIG. 4. Power is supplied to the control circuit by means of line 90 which are connected to a suitable source of A.C. power and to a timer mechanism 92. The timer mechanism 92 includes a clockwork of known structure, for opening and closing, at predetermined times, a pair of contacts. Electrical power is supplied through these contacts to the lines 94 and 96 and a terminal box 98 which is on the feed diffusing assembly 38, as shown in FIGS. 2 and 3. The terminal box 98 includes a receptacle 100 to which the motor 24 is connected by means of conductors or leads 102. The line 94 is connected form a terminal 104 in the terminal box 98 to the switch assembly 68 by a lead or line 106.

The switch assembly 68 includes a movable contactor bar 110 which is permanently connected to the line or lead 106. The contactor bar 110 is pivotal, by actuation of the plunger 70, between two fixed contacts 112 and 114. The fixed contact 114 is connected to the receptacle 100 by a lead or conductor 116. Therefore, when the contactor bar is in the position shown in FIG. 4, and the switch in the timer 92 is closed, the motor 24 is energized through the lead 96 and the leads 94, 106 and 116.

The switch assembly 68 is connected to the electromagnet 80 by the lead 84 which is secured to the fixed contact 112. When the contactor bar 110 is pivoted from the position shown in FIG. 4 into engagement with the fixed contact 112 by depressing the plunger 70, the electromagnet 80 is energized through the leads 94, 106, 84, 86 and 96. It should be noted that when the electromagnet 80 is energized, the electric motor 24 is deenergized to disable the conveyor line 22.

The timer 92 may be programmed to close a suitable switch for a predetermined length of time at predetermined times during the day. Thus, power from the line 90 is connected through the timer 92 to the lines 94 and 96 for predetermined time periods which can be altered by making suitable adjustments in the timer 92. This programming of the timer 92 enables the control circuit to be energized at predetermined times during the day so that the drive motor 24 powers the conveyor line 22 at a predetermined time, depending upon the feeding schedule for the poultry.

For purposes of affording a more complete understanding of the invention, it is advantageous now to provide a functional description of the mode in which the component parts thus far identified cooperate. The feeding line 10, of a mechanical poultry feeder system, is regulated by means of a control feeding station 26. At predetermined feeding times durng the day the timer 92 will close a pair of contacts to energize the drive motor 24 for the feeding line 10. Energization of the drive motor 24 will rotate the conveyor screw 32 to conduct feed 36 to a plurality of feeding stations spaced along the conveyor 22. As the feed is accumulated in the control feeding pan 20, the sensing panel 60 will be gradually pivoted outwardly toward an electromagnet 80. As the panel 60 is pivoted outwardly, a plunger 70 of the switch assembly 68 will be actuated to swing a conductor bar 110 and energize the electromagnet 80. The swinging of the conductor bar 110 will open the power circuit to the electric motor 24 and deenergize the motor to stop the conveyor 22. Thus, at predetermined times during the day a predetermined amount of feed, that is the amount of feed required to pivot the panel 60 to actuate the switch 68, will be accumulated at the control feeding station 26.

The electromagnet 80 will remain energized as long as the contacts in the timer 92 are closed. This energization of the electromagnet 80 prevents the motor 24 from being re-energized as the feed in the control feed panel 20 is depleted due to the consumption of feed by the poultry. The timer 92 is programmed so that at the end of a predetermined time period, for example, one hour, the timer will open the contacts to deenergize the electromagnet 80. When the electromagnet 80 has been deenergized and the feed supply depleted, the pressure of the spring loaded plunger 70 against the sensing panel 60 will tend to swing the sensing panel inwardly toward the position shown in FIG. 2.

At the next programmed feeding time, the timer 92 will again close its internal contacts to energize the leads 94 and 96. If the feed supply has been depleted by the consumption by the birds, the panel 60 will have swung inwardly and the switch assembly 68 will be positioned as shown in FIG. 4 to energize the motor 24, and the conveyor line of the conveyor 22 will be recycled in the manner previously explained. If, for some reason, the poultry should not consume the feed in the pan 20 of the control feeding station 26 the sensing panel 60 will be pressed outwardly, by the unconsumed feed, to actuate the switch assembly 68 and energize the magnet 80 and prevent the motor 24 from being energized. Therefore, the control feeding station provides for the accumulation of a predetermined quantity of feed at predetermined times during the day. The control system also prevents the birds from consuming feed rapidly in the feed pan while the motor 24 is being energized for a predetermined period and recycling the conveyor 22, since once the predetermined volume of feed has been accumulated, the motor is deenergized, and retained in the deenergized condition until the next feeding period, by the sensing panel 60 and timer 92.

Although a panel 60 is provided to senes the volume of feed at the control feeding station 62, it is contemplated that the quantity of feed could also be sensed by a suitable lever arrangement whch would sense the weight of the feed at the control feeding station 26. It is also contemplated that the timer could, by those skilled in the art, be programmed for different combinations of periods than those disclosed. It will also be apparent to those skilled in the art that the novel control system utilized at the control feeding station 26 could be installed in a mechanical feeder system utilizing troughs and conveyor structure other than that illustrated in the preferred embodiment of my invention. Therefore, it should be understood, of course, that the invention is not limited to the preferred embodiment disclosed herein; and it is contemplated to cover by the appended claims any modifications as fall within the true spirit and scope of the invention.

What is claimed is:

1. A control system for a drive means to a mechanical feeder comprising: a circuit means connected to the drive means; a first control means connected to said circuit means normally permitting energizing of said drive means in the absence of a predetermined quantity of feed at a feeding station and responsive to the sensing of the presence of a predetermined quantity of feed at said feeding station for deenergizing said drive means; and a second control means connected to said circuit means for retaining the drive means in a deenergized condition after the drive means is initially deenergized by the first control means and the feed is at least partially removed from said feeding station whereby said drive means is deenergized and retained in a deenergized condition after a predetermined quantity of feed has been accumulated at the feeding station, and time responsive means connected to said second control means for disabling said second control means at predetermined times to reenergize the drive means until said first control means again senses the presence of the predetermined quantity of feed at the feeding station.

2. A control system for a drive means to a mechanical feeder comprising: a circuit means connected to said drive means for energizing the drive means; a first control means connected to said circuit means normally permitting energizing of said drive means in the absence of a predetermined quantity of feed at a feeding station and responsive to the sensing of the presence of a predetermined quantity of feed at said feeding station for deenergizing the drive means; and a second control means connected to said circuit means for retaining the drive means in a deenergized condition after the drive means is initially deenergized by the first control means and the feed is at least partially removed from said feeding station; said first control means including lever means which is movable from a first position to a second position in which the drive means is deenergized, said lever means being moved from said first position to said second position by the accumulation of a predetermined quantity of feed at the feeding station; and said second control means including electromagnet means for retaining said lever means in said second position.

3. A control system as set forth in claim 2 wherein: said second control means includes time responsive means disabling said electromagnet means to release said lever means at the end of a predetermined time period.

4. A control assembly as set forth in claim 2 wherein: a downwardly extending feed diffusing means is mounted at the feeding station for conducting feed to a receptacle means, said lever means being pivotably mounted within said feed diffusing means; and said electromagnet means being mounted on a side wall of said feed diffusing means.

5. A control assembly as set forth in claim 1 wherein: the mechanical feeder includes a downwardly extending feed diffusing means mounted at the feeding station for conducting feed to a receptacle means, said feed diffusing means including first and second spaced apart substantially parallel sidewall means interconnected by a third sidewall means; said first control means includes panel means extending between said first and second sidewall means and pivotably supported by said first sidewall means in a position spaced apart from said third sidewall means, said panel means being pivotal from a first position to a second position by the accumulation of a predetermined quantity of feed in the receptacle means to deenergize the drive means.

6. An assembly as set forth in claim 5 wherein: said second control means includes electromagnet means mounted on said third sidewall means for retaining said panel means in said second position even when the quantity of feed in the receptacle is below the predetermined quantity required to pivot said panel from said first to said second position.

7. An assembly as set forth in claim 5 wherein: the mechanical feeder includes a conveyor means having aperture means through which feed flows at each feeding station into said feed diffusing means; said feed diffusing means, receptacle means and drive means all being supported by said conveyor means.

8. An assembly comprising a mechanical feeder including drive means and a control system for said drive means; said control system including a circuit means connected to the drive means for energizing the drive means; a first control means connected to said circuit means for deenergizing the drive means in response to the sensing of the presence of a predetermined quantity of feed at the feeding station by said first control means; the second control means connected to said circuit means for retaining the drive means in a deenergized condition after the drive means is initially deenergized by the first control means; said mechanical feeder including a conveyor means having aperture means through which feed flows at each feeding station into feed diffusing means which conducts the feed into a receptacle means, said feed diffusing means, receptacle means and drive means all being supported by said conveyor means; said feed diffusing means including first and second spaced apart substantially parallel sidewall means interconnected by a third sidewall means; said first control means including a panel means extending between said first and second sidewall means and pivotably supported by said first sidewall means in a position spaced apart from said third sidewall means, said panel means being pivotal by the accumulation of a predetermined quantity of feed in the receptacle means from a first position to a second position to deenergize the drive means; said second control means including electromagnet means mounted on said third sidewall for retaining said panel in said second position even when the quantity of feed in the receptacle is below the quantity required to pivot said panel from said first to said second position; and said second control means further including time responsive means for disabling said electromagnet means at a predetermined time to enable said panel to pivot from said second position to said first position.

References Cited
UNITED STATES PATENTS

| | | | |
|---|---|---|---|
| 3,033,163 | 5/1962 | Hostetler et al. | 119—52 |
| 3,180,318 | 4/1965 | Fisher | 119—56 |
| 3,225,742 | 12/1965 | Hagans | 119—51.11 |
| 3,230,933 | 1/1966 | Myers et al. | 119—53 |

HUGH R. CHAMBLEE, *Primary Examiner.*

U.S. Cl. X.R.

222—70